J. F. M. PATITZ.
TRACTOR.
APPLICATION FILED APR. 18, 1917.

1,344,209.

Patented June 22, 1920.

Inventor
J. F. M. Patitz by
Attorney

UNITED STATES PATENT OFFICE.

JOHANN FRIEDRICH MAX PATITZ, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

TRACTOR.

1,344,209.      Specification of Letters Patent.      Patented June 22, 1920.

Application filed April 18, 1917. Serial No. 163,306.

*To all whom it may concern:*

Be it known that I, JOHANN FRIEDRICH MAX PATITZ, a citizen of the United States, residing at Milwaukee, in the county of Milwaukee and State of Wisconsin, have invented a certain new and useful Improvement in Tractors, of which the following is a specification.

This invention relates to improvements in the construction of tractors and is especially applicable to motor-driven tractors for agricultural purposes and the like.

An object of the invention is to produce a tractor which is simple in construction and efficient in operation. Another object is to provide a rigid tractor frame structure capable of resisting abnormal strains. A further object is to provide a frame structure which may be manufactured at minimum cost. Still another object is to provide a one-piece cast metal tractor frame which may be readily machined for attachment of structural elements thereto.

A clear conception of an embodiment of the invention may be had by referring to the drawing accompanying and forming a part of this specification, in which like reference characters designate the same parts in the various views.

While the invention has been disclosed as embodied specifically in a three-wheel motor driven tractor having two positively driven rear wheels and a single front steering wheel arranged in line with one of the rear wheels, it should be understood that the invention is also applicable to other types of motor-driven vehicles.

Figure 2:
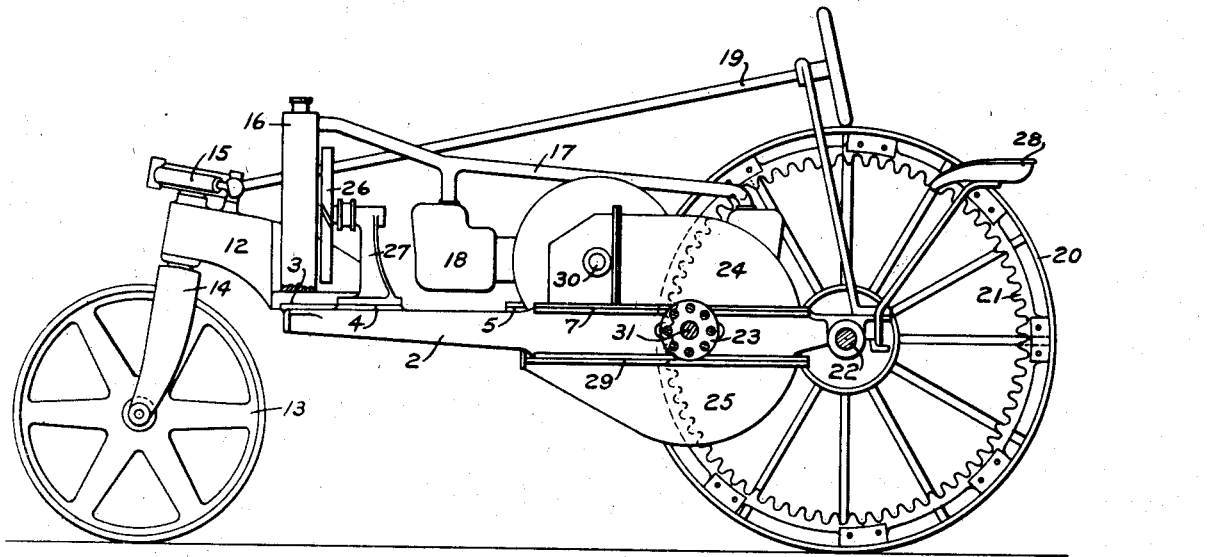
Fig. 2 is a side part sectional elevation of a tractor, showing a main frame built in accordance with the disclosure in Fig. 1, applied therein.

The tractor disclosed in Fig. 2 comprises a main frame 2 having associated therewith a front steering wheel bracket 12, a fan bracket 27, an internal combustion engine 18, transmission gearing housings 24, 25, an axle 22 and a driving shaft 31. Power is transmitted from the engine 18 through the shaft 30 and the usual clutch and transmission gearing, to the driving shaft 31, from which it is delivered through the bull pinions 23 and annular internal gears 21, to the rear driving wheels 20. The front steering wheel 13 is mounted in a forked member 14 which is pivotally mounted in the steering wheel bracket 12. Steering wheel actuating mechanism 15 of ordinary construction is associated with the upper end of the pivotal mounting of the forked member 14, and is manipulable by means of a steering hand wheel and rod 19. An operator's seat 28 secured to the rear end of the main frame 2, permits manipulation of the steering wheel and engine-controlling mechanism, in the usual manner. A radiator 16 mounted upon the leading end of the frame 2 adjacent the steering wheel bracket 12, communicates with the engine jackets through suitable piping 17. A radiator fan 26 mounted in the bracket 27 is driven in the usual manner by the engine 18.

Figure 1:
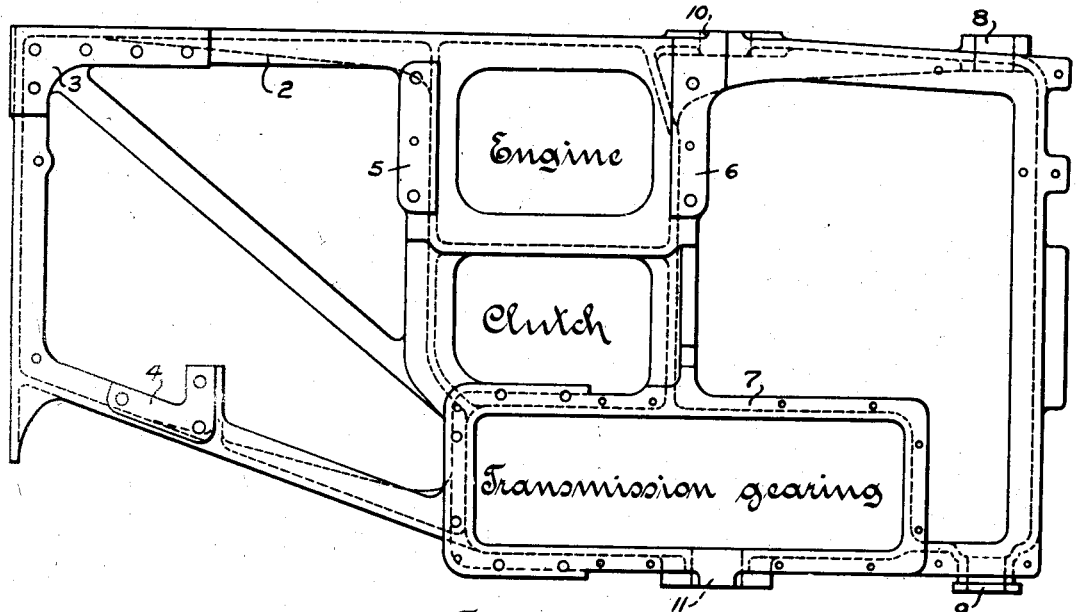
Figure 1 is a top view of a tractor main frame.

The tractor main frame 2, see Fig. 1, is substantially rectangular in shape and is provided on its upper side with a series of pads 3, 4, 5, 6 and 7. The steering wheel bracket 12 is normally engageable with the upper surface of the pad 3. The radiator fan bracket 27 is normally engageable with the upper surface of the pad 4. The internal combustion engine 18 is normally engageable with the upper surfaces of the front and rear engine pads 5, 6. The upper transmission gearing housing 24 is normally engageable with the upper surface of the pad 7, while the lower transmission gearing housing 25 is normally engageable with a lower surface of a lower frame pad 29. The upper surfaces of the pads 3, 4, 5, 6 and 7 lie in a common plane, thereby permitting finishing of these surfaces with but one setting of the finishing tool. The side members of the frame 2 are provided with alined bores 10, 11, within which the bearing boxes of the driving shaft 31 are normally located. The frame 2 is also provided with hubs 18 formed with alined bores within which the axle 22 is rotatably mounted.

The frame 2 is preferably formed of cast metal such as steel and may be finished with the use of a planer. After the lower surface of the lower pad 29 has been finished, the frame 2 may be set directly upon the planer bed with the lower finished surface of the pad 29 in engagement with the planer bed, and the upper surfaces of the pads 3, 4, 5, 6 and 7 may then be machined with a single setting of the planer tool. In order to facilitate this finishing of the main frame casting, the upper and lower surfaces of the projecting pads are preferably made parallel to each other. If so desired, the upper surfaces may be finished first, and the lower surface subsequently. The bores in the frame 2 within which the driving shaft 31 and the axle 22 are normally mounted, may be readily machined with the use of suitable boring implements in the usual manner.

It will be noted that by forming the main frame 2 in one piece, the use of rivets, bolts, or other like fastening means such as are ordinarily employed in the built-up frames of the prior art, is avoided and a frame of enormous strength capable of resisting abnormal strains, is produced. By forming the surfaces of all of the pads 3, 4, 5, 6 and 7 in a common plane, construction of the frame is simplified and the manufacturing cost is reduced to a minimum. The simple method of machining the frames 2 also permits making these frames interchangeable, thereby facilitating assembling of the tractors in large numbers. These frames may also be machined several at one time providing a finishing machine of sufficient size is available.

It should be understood that it is not desired to limit the invention to the exact details of construction herein shown and described, for various modifications within the scope of the appended claims may occur to persons skilled in the art.

It is claimed and desired to secure by Letters Patent:

1. As an article of manufacture, a one-piece cast-metal tractor frame having a plurality of local projecting pads provided with surfaces lying in a common plane beyond all other parts of the frame between said surfaces, whereby a planer tool may be utilized to finish said pads and produce said surfaces without striking any other part of said frame.

2. As an article of manufacture, a one-piece cast-metal tractor frame having its opposite sides provided with local projecting pads having surfaces lying in parallel planes beyond all other parts of the corresponding sides of said frame, whereby a planer tool may be utilized to finish the pads on one side of said frame without striking any other parts thereof and said frame may be subsequently reversed and placed directly upon the planer bed and a planer tool utilized to finish in like manner the pads on the opposite side of the frame.

In testimony whereof, the signature of the inventor is affixed hereto.

JOHANN FRIEDRICH MAX PATITZ.